US012352201B1

(12) United States Patent
Parzer

(10) Patent No.: US 12,352,201 B1
(45) Date of Patent: Jul. 8, 2025

(54) METHOD FOR CONTROLLING A WASTEGATE VALVE OF A TURBOCHARGER

(71) Applicant: BRP-ROTAX GMBH & CO. KG, Gunskirchen (AT)

(72) Inventor: Herbert Parzer, Pichl bei Wels (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/808,504

(22) Filed: Aug. 19, 2024

Related U.S. Application Data

(60) Provisional application No. 63/675,309, filed on Jul. 25, 2024.

(51) Int. Cl.
*F02B 37/18* (2006.01)
*F02D 41/00* (2006.01)

(52) U.S. Cl.
CPC ........ *F02B 37/183* (2013.01); *F02D 41/0007* (2013.01)

(58) Field of Classification Search
CPC ........ F02B 37/12; F02B 37/18; F02B 37/183; F02B 37/186; F02D 41/0007
See application file for complete search history.

(56) References Cited

U.S. PATENT DOCUMENTS

2015/0240707 A1* 8/2015 Wang .................... F02D 41/248 60/602

FOREIGN PATENT DOCUMENTS

DE 102009028117 A1 2/2011
DE 102012006532 A1 10/2013

OTHER PUBLICATIONS

Hella; "Rotatory smart actuators for high temperatures"; retrieved from https://www.hella.com/soe/en/Products/Product-detail-4957/?pid=2301 on Aug. 16, 2024.
Hella GMBH & Co. KGAA, Forvia-Brief Information—Rotatory smart actuator for high temperatures, Lippstadt, Jul. 2023.

* cited by examiner

*Primary Examiner* — Loren C Edwards
(74) *Attorney, Agent, or Firm* — BCF LLP

(57) ABSTRACT

A method for controlling a wastegate valve of a turbocharger and the turbocharger of a vehicle are disclosed. The method includes (a) receiving a closed position request; (b) moving an actuator toward a previously stored closed position until a predetermined actuator position is reached, the actuator being operatively connected to the wastegate valve for actuating the wastegate valve; (c) receiving an actual value indicative of force exerted by the actuator; and (d) comparing the actual value to an expected value indicative of force exerted by the actuator; in response to the actual value being less than the expected value, (e) moving the actuator away from an open position by a predetermined amount; (f) replacing the previously stored closed position with a position of the actuator following step (e); and (g) repeating steps (d) to (f) until the actual value is greater than the expected value.

20 Claims, 10 Drawing Sheets

METHOD FOR CONTROLLING A WASTEGATE VALVE OF A TURBOCHARGER

CROSS-REFERENCE

The present application claims priority to U.S. Provisional Patent Application No. 63/675,309, filed Jul. 25, 2024, entitled "METHOD FOR CONTROLLING A WASTEGATE VALVE OF A TURBOCHARGER", which is incorporated by reference herein in its entirety.

TECHNICAL FIELD

The present technology relates to a turbocharger connected to an internal combustion engine, specifically a method for controlling a wastegate valve of the turbocharger.

BACKGROUND

Turbochargers are widely used in internal combustion engines to enhance engine performance by increasing the amount of air intake, thereby improving efficiency and power output of the engine. Typically, a turbocharger includes a turbine housing, which houses a turbine wheel driven by exhaust gases from the engine. A wastegate valve regulates the amount of exhaust gas that is directed to the turbine wheel, thereby controlling the boost pressure generated by the turbocharger. When the wastegate valve is fully closed, the exhaust gases are directed towards the turbine wheel, causing an increase in boost pressure and power output of the engine. When the wastegate valve is opened, at least some of the exhaust gases bypass the turbine wheel, reducing boost pressure.

During engine operation, the turbine housing is exposed to high temperatures from the exhaust gases. These elevated temperatures may cause the turbine housing to undergo thermal expansion, causing deformation of the housing, impacting alignment, and sealing of the wastegate valve. Thus, the wastegate valve may not completely close, leading to some of the exhaust gases bypassing the turbine wheel, reducing boost pressure generation, and ultimately reducing the efficiency of the turbocharger and power output of the engine.

Therefore, there is a desire for a method of controlling the wastegate valve of a turbocharger without at least some of the inconveniences described above.

SUMMARY

It is an object of the present technology to ameliorate at least some of the inconveniences present in the prior art.

According to one aspect of the present technology, a method for controlling a wastegate valve of a turbocharger fluidly connected to an internal combustion engine of a vehicle is provided. The method being executed by a controller of the vehicle, the method including: (a) receiving a closed position request from an engine control unit; (b) moving an actuator toward a previously stored closed position until a predetermined actuator position is reached, the actuator being operatively connected to the wastegate valve for actuating the wastegate valve; (c) once the predetermined actuator position is reached, receiving an actual value indicative of force exerted by the actuator; and (d) comparing the actual value indicative of force exerted by the actuator to an expected value indicative of force exerted by the actuator; in response to the actual value indicative of force being less than the expected value indicative of force, (e) moving the actuator away from an open position by a predetermined amount; (f) replacing the previously stored closed position with a position of the actuator following step (e); and (g) repeating steps (d) to (f) until the actual value indicative of force exerted by the actuator is greater than the expected value indicative of force exerted by the actuator.

In some embodiments, in response to the actual value indicative of force exerted by the actuator being greater than the expected value indicative of force exerted by the actuator, the method further includes: (h) moving the actuator toward the open position by the predetermined amount; and (i) replacing the previously stored closed position with a position of the actuator following step (h); and (j) repeating step (d) following step (i).

In some embodiments, steps (c) to (j) are performed for a predetermined time.

In some embodiments, after the predetermined time, the method further includes: (k) moving the actuator away from the previously closed position until a position of an output member of the actuator changes; (l) replacing the previously stored closed position with a position of the actuator following step (k); (l) setting a timer for timing the predetermined time interval to zero seconds, and (m) continuing the method at step (c).

In some embodiments, the position of the actuator is determined by an output member position sensor.

In some embodiments, the method further includes, prior to step (a), receiving a desired position request for a desired position of the actuator; comparing the desired position of the actuator with a predetermined threshold; and in response to the desired position of the actuator exceeding the predetermined threshold, continuing onto step (a), wherein the closed position request at step (a) is the desired position request.

In some embodiments, the method further includes indicating an error if the desired position of the actuator is outside an allowable range.

In some embodiments, at step (b), the actuator moves the wastegate valve at a first speed; and at step (e), the actuator moves the wastegate valve at a second speed, the second speed being less than the first speed.

In some embodiments, the method further includes indicating an error if the position of the actuator at step (f) is outside an allowable range.

In some embodiments, in response to the internal combustion engine powering off, the method further includes moving the actuator to the open position.

In some embodiments, in response to the internal combustion engine powering on, the method further includes: receiving the previously stored closed position of the actuator from a memory storage of the engine control unit; and receiving the open position of the actuator from the memory storage of the engine control unit.

In some embodiments, the expected value indicative of force exerted by the actuator is a predetermined value indicative of force.

In some embodiments, the actual value indicative of force exerted by the actuator is based on an actual duty cycle of the actuator, and the expected value indicative of force exerted by the actuator is based on an expected duty cycle of the actuator.

In some embodiments, the predetermined amount is 0.01% of a total actuator working range.

In some embodiments, the open position of the actuator is fixed.

In some embodiments, in response to receiving an intermediate position request from the engine control unit for an intermediate position of the actuator, the intermediate position of the actuator being between the open position and the previously closed position, the method further includes: re-scaling the intermediate position of the actuator based on the previously stored closed position.

In some embodiments, the predetermined actuator position is the previously stored closed position.

According to another aspect of the present technology, a turbocharger system for an internal combustion engine of a vehicle is provided. The turbocharger system includes: a turbocharger having: a turbine housing; and a turbine disposed in the turbine housing; a bypass conduit defined by the turbine housing for selectively diverting exhaust gases away from the turbine; a wastegate valve disposed in the bypass conduit for controlling flow of the exhaust gases through the bypass conduit; an actuator having an output member operatively connected to the wastegate valve, the actuator movable between an open position and a previously stored closed position; and a wastegate controller communicatively coupled to the actuator for controlling operation of the actuator for controlling the wastegate valve, the wastegate controller being configured to: (a) receive a closed position request from an engine control unit of the vehicle; (b) move the actuator toward the previously stored closed position until a predetermined actuator position is reached; (c) once the predetermined actuator position is reached, receive an actual value indicative of force exerted by the actuator; (d) comparing the actual value indicative of force exerted by the actuator to an expected value indicative of force exerted by the actuator; in response to the actual value indicative of force being less than the expected value indicative of force, (e) move the actuator away from the open position by a predetermined amount; (f) replace the previously stored closed position with a position of the actuator following step (e); and (g) repeat steps (d) to (f) until the actual value indicative of force exerted by the actuator is greater than the expected value indicative of force exerted by the actuator.

In some embodiments, the actuator is an electronic actuator.

In some embodiments, the actuator includes an output member position sensor configured to detect a position of the output member.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale.

DETAILED DESCRIPTION

The present technology is described with reference to its use in an off-road side-by-side vehicle (SSV). It is contemplated that the present technology could be implemented in different vehicles, including but not limited to all-terrain vehicles (ATVs), automobiles, other off-road vehicles, snowmobiles, and karts.

Figure 1:
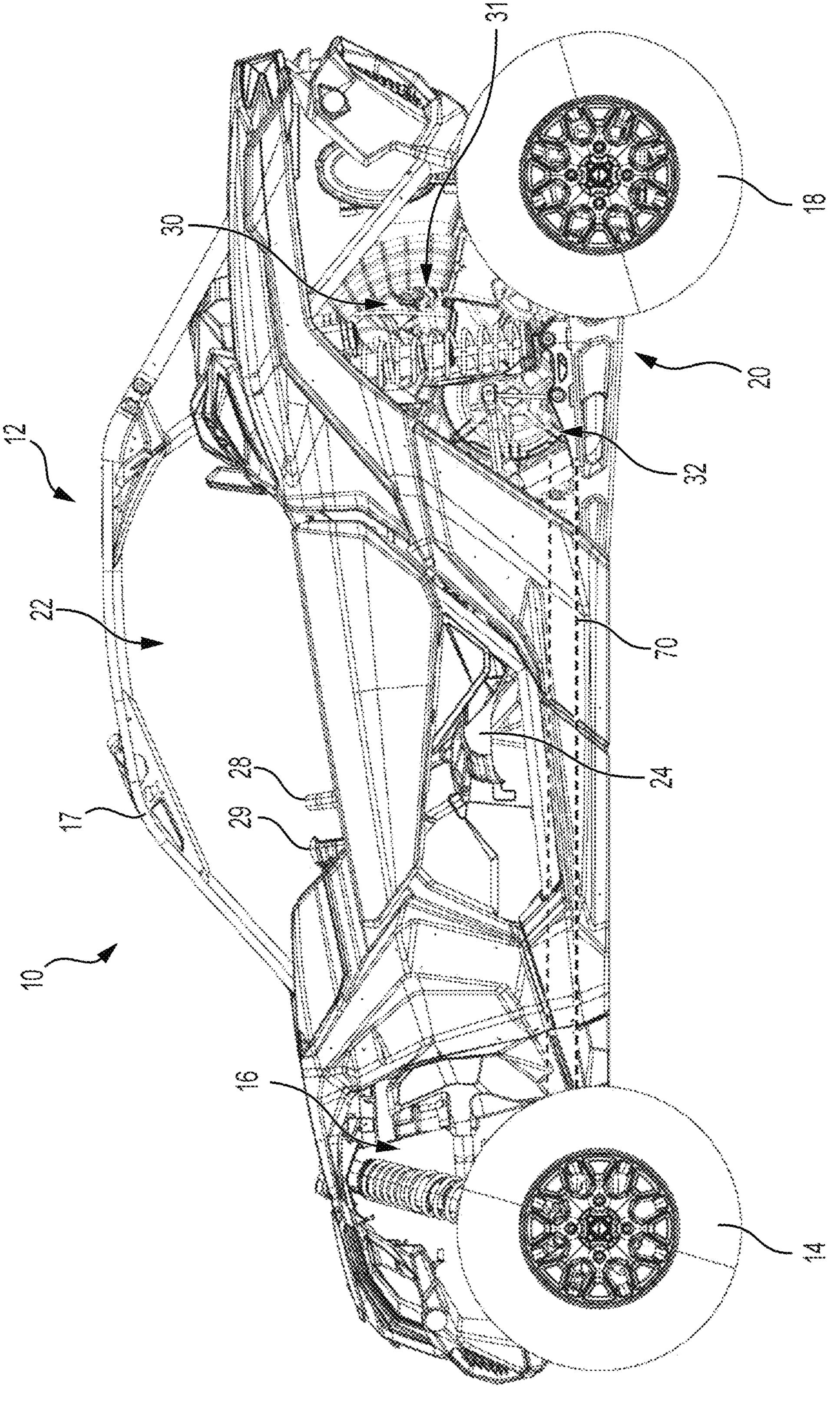
FIG. 1 is a left side elevation view of a vehicle.
Figure 2:
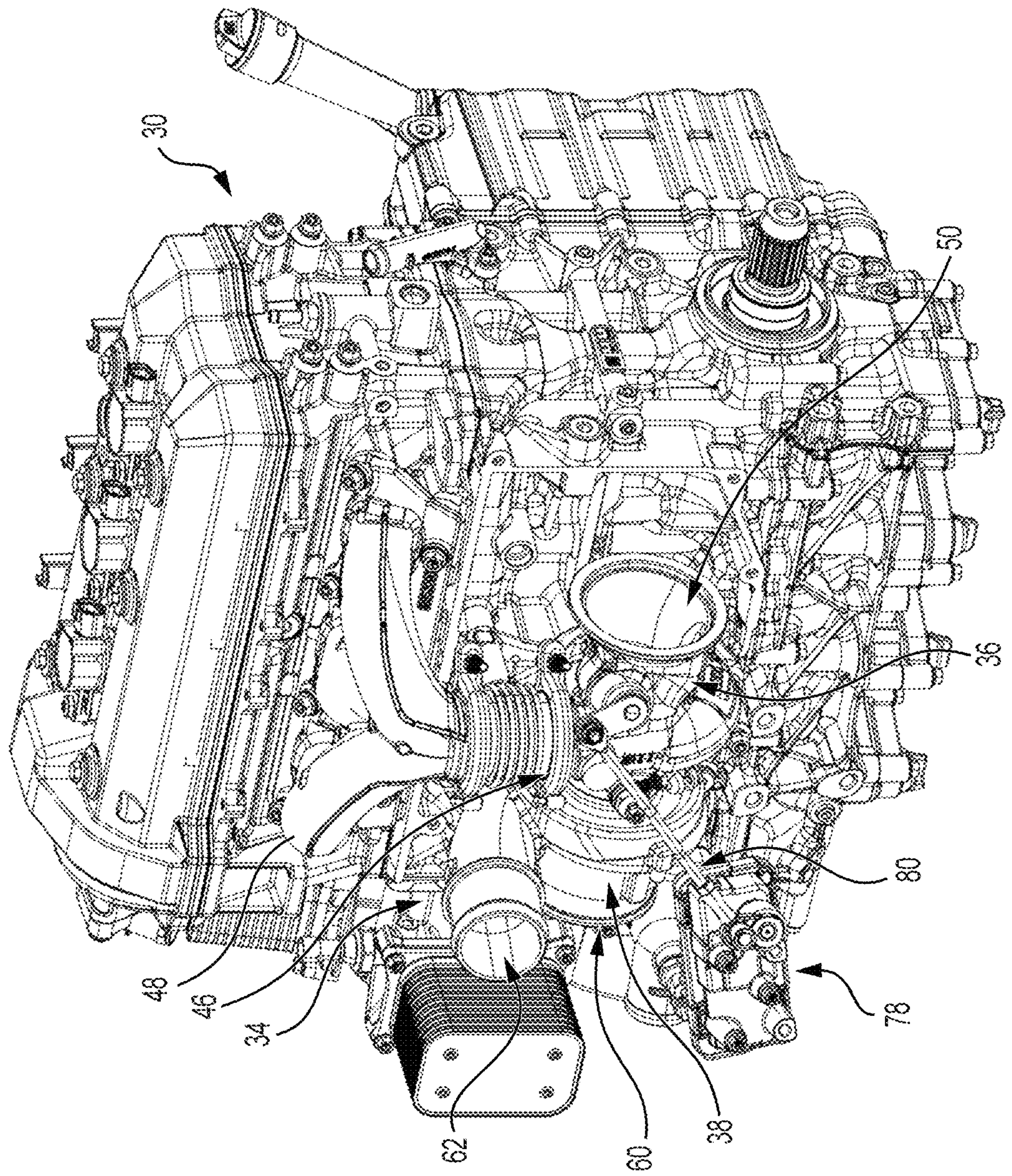
FIG. 2 is a perspective view taken from a front, left side of an internal combustion engine and a turbocharger of the vehicle of FIG. 1.

The general features of a side-by-side vehicle (SSV) 10 will be described with respect to FIG. 1. The vehicle 10 has a frame 12, two front wheels 14 connected to a front of the frame 12 by front suspension assemblies 16, and two rear wheels 18 connected to the frame 12 by rear suspension assemblies 20.

The frame 12 defines a central cockpit area 22 inside which are disposed a driver seat 24 and a passenger seat (not shown). A roll cage 17 defines a top side of the cockpit area 22. In the present embodiment, the driver seat 24 is disposed on the left side of the vehicle 10 and the passenger seat is disposed on the right side of the vehicle 10. However, it is contemplated that the driver seat 24 could be disposed on the right side of the vehicle 10 and that the passenger seat could be disposed on the left side of the vehicle 10.

A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, an error indicator display, a speedometer, a tachometer, a fuel gauge, a transmission position display, and an oil temperature gauge.

The vehicle 10 further includes an engine assembly 31, which includes an engine 30, a continuously variable transmission (CVT) 32, and a transmission (not shown). The engine assembly 31 is connected to the frame 12 in a rear portion of the vehicle 10. In the present embodiment, the engine 30 is a three-cylinder, four-stroke internal combustion engine 30 (hereinafter an engine 30). It is contemplated that other types of internal combustion engines could be used, such as a V-twin or a two-stroke internal combustion engine for example.

The engine 30 is connected to the CVT 32 which is operatively connected to driveshaft 70 (shown schematically in FIG. 1) via the transmission to transmit torque from the engine 30. The driveshaft 70 includes a front driveshaft and a rear driveshaft (not separately illustrated), operatively connected to the front and rear wheels 14, 18 respectively to propel the vehicle 10.

With reference to FIGS. 2 to 6, a turbocharger 34 is operatively connected to the engine 30. The turbocharger 34 compresses air and feeds it to the engine 30. The turbocharger 34 has a turbine 36 and a compressor 38. The turbine 36 is propelled by exhaust gases produced by the engine 30. The compressor 38 is powered by the turbine 36 to supply compressed air to the engine 30.

The turbine 36 includes a turbine housing 40 and a turbine wheel 42 disposed inside the turbine housing 40. The turbine wheel 42 has a plurality of turbine blades 44 which rotate about a turbine axis 47. The turbine housing 40 defines an exhaust gas inlet 46 in fluid communication with an outlet of an exhaust manifold 48 of the engine 30. The turbine housing 40 also defines an exhaust gas outlet 50 in fluid communication with an exhaust system (not shown).

The compressor 38 includes a compressor housing 52 and a compressor wheel 54 disposed inside the compressor housing 52. The compressor wheel 54 has a plurality of compressor blades 56 which rotate about a compressor axis 58. The compressor housing 52 defines an air inlet 60 in fluid communication with an air intake system (not shown) of the engine 30. The compressor housing 52 also defines an air outlet 62 in fluid communication with air inlet ports (not shown) of the engine 30.

The turbine wheel 42 is mounted to an end of a shaft 64 and drives the rotation of the shaft 64. When the turbocharger 34 is in use, the turbine wheel 42 is driven by the exhaust gases flowing into the exhaust gas inlet 46 and through a volute 66 defined by the turbine housing 40. The exhaust gases that enter a chamber 68 defined by the turbine housing 40 cause the turbine wheel 42 to rotate, and thus the shaft 64 on which the turbine wheel 42 is mounted, rotates about the turbine axis 46. Exhaust gases then flow out of the chamber 68 via the exhaust gas outlet 50.

The compressor wheel 54 is mounted to an opposite end of the shaft 64 and is driven by the rotation of the shaft 64. When the turbocharger 34 is in use, the shaft 64 is driven by the turbine wheel 42 which, in turn, drives the compressor wheel 54. Air enters a chamber 170 defined by the compressor housing 52 via the air inlet 58. The air is compressed by the compressor wheel 54 that rotates about the compressor axis 58. The compressed air then flows from the chamber 170 to the air outlet 62 via a volute 72, defined by the compressor housing 52, and flows into air inlet ports of the engine 30.

The turbine housing 40 defines a bypass conduit 74 in fluid communication with the volute 66 for selectively diverting the flow of exhaust gases to bypass the turbine wheel 42. Flow of the exhaust gases through the bypass conduit 74 is selectively controlled by a wastegate valve 76, such as a flapper valve, disposed in the bypass conduit 74. The wastegate valve 76 selectively moves between a closed position (FIG. 5) and an opened position (FIG. 6).

Figure 5:
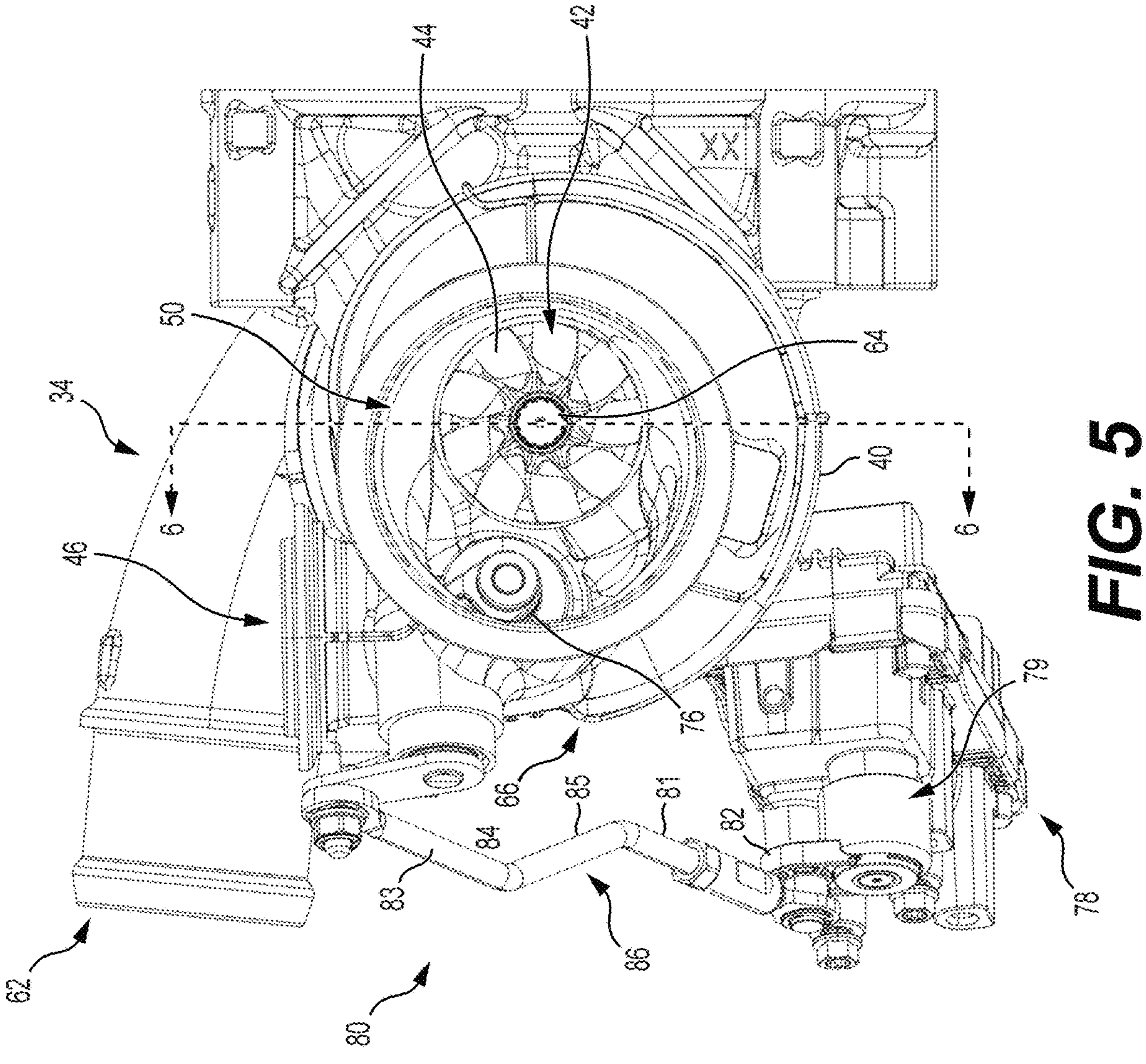
FIG. 5 is a left side elevation view of the turbocharger of FIG. 3, with the wastegate valve of the turbocharger in the closed position.

With reference to FIG. 5, in the closed position, the wastegate valve 76 covers and seals the bypass conduit 74 completely, directing the exhaust gases towards the chamber 68. As described above, the flow of the exhaust gases into the chamber 68 drive rotation of the turbine wheel 42 which drives the compressor wheel 54 (via rotation of the shaft 64), compressing the intake air and resulting in an increase in boost pressure supplied to the engine 30. Thus, when the wastegate valve 76 is in the closed position, the turbocharger 34 produces maximum boost pressure as all the exhaust gases are directed to spin the turbine wheel 42.

Figure 6:
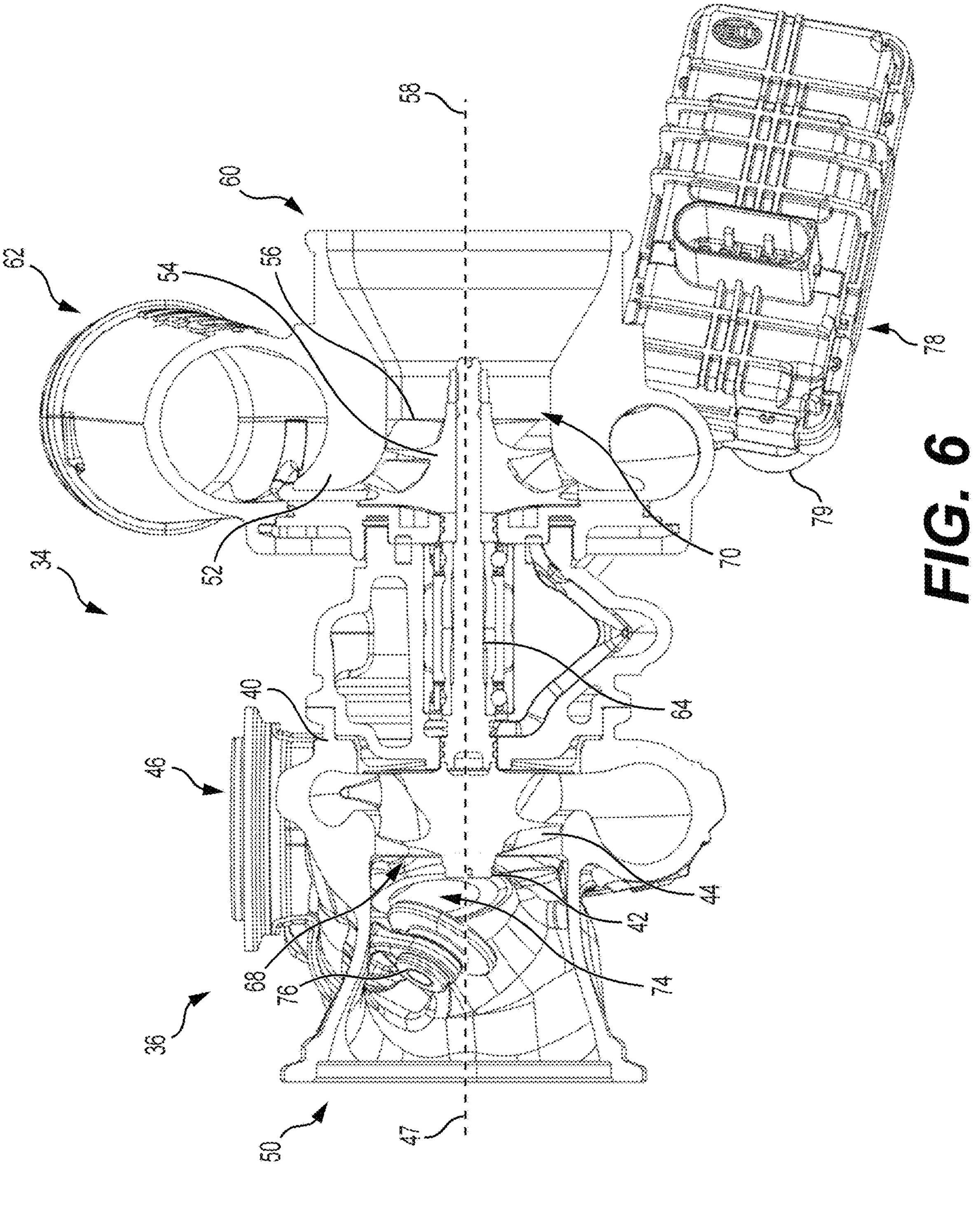
FIG. 6 is a cross-sectional view of the turbocharger of FIG. 5 taken along line 6-6, with the wastegate valve of the turbocharger in an opened position.

With reference to FIG. 6, in the open position, the wastegate valve 76 uncovers the bypass conduit 74, creating an alternate pathway for the flow of exhaust gases. A portion of the exhaust gas is now diverted through the bypass conduit 74, bypassing the turbine wheel 42. In turn, the amount of exhaust gas directed to the turbine wheel 42 is reduced which slows down rotation of the turbine wheel 42, thereby slowing down rotation of the compressor wheel 54, leading to a decrease in boost pressure.

The wastegate valve 76 is operatively connected to a wastegate actuator 78 for controlling the position of the wastegate valve 76 between the closed and opened positions. In this embodiment, the wastegate actuator 78 is an electronic actuator with an output member 79, which in this embodiment is an output shaft 79 operatively connected to the wastegate valve 76 via a linkage assembly 80 described in further detail below. The output shaft 79 of the wastegate actuator 78 is rotated by an electric motor via a worm gear (not separately illustrated). The worm gear allows for precise rotation of the output shaft and, as worm-gears are generally self-locking, helps maintain the position of the wastegate actuator 78, preventing unwanted backdriving. It is contemplated that, in alternative embodiments, the wastegate actuator 78 may be any other suitable actuator such as a pneumatic or hydraulic actuator.

Figure 3:
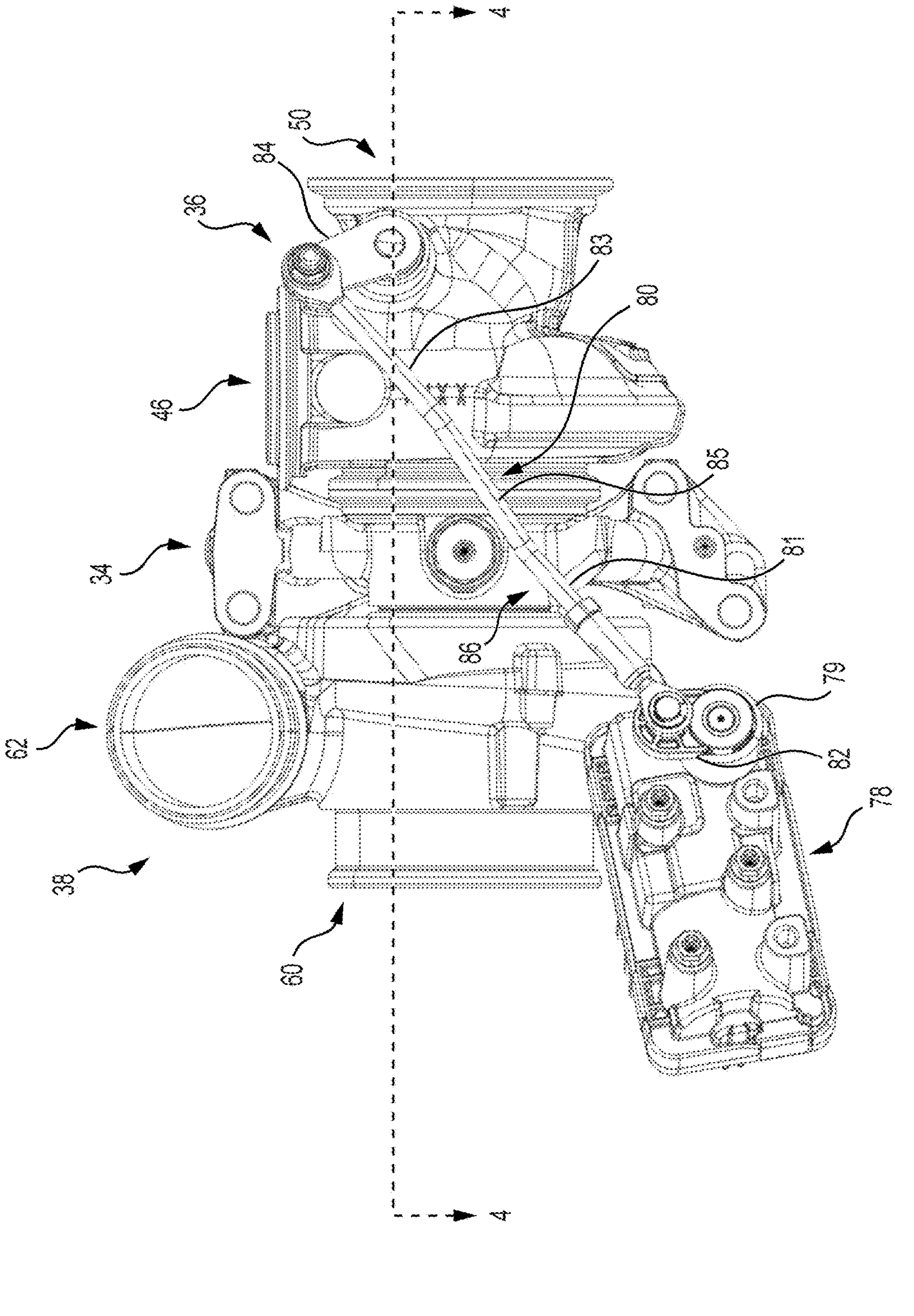
FIG. 3 is a front elevation view of the turbocharger of FIG. 2.
Figure 4:
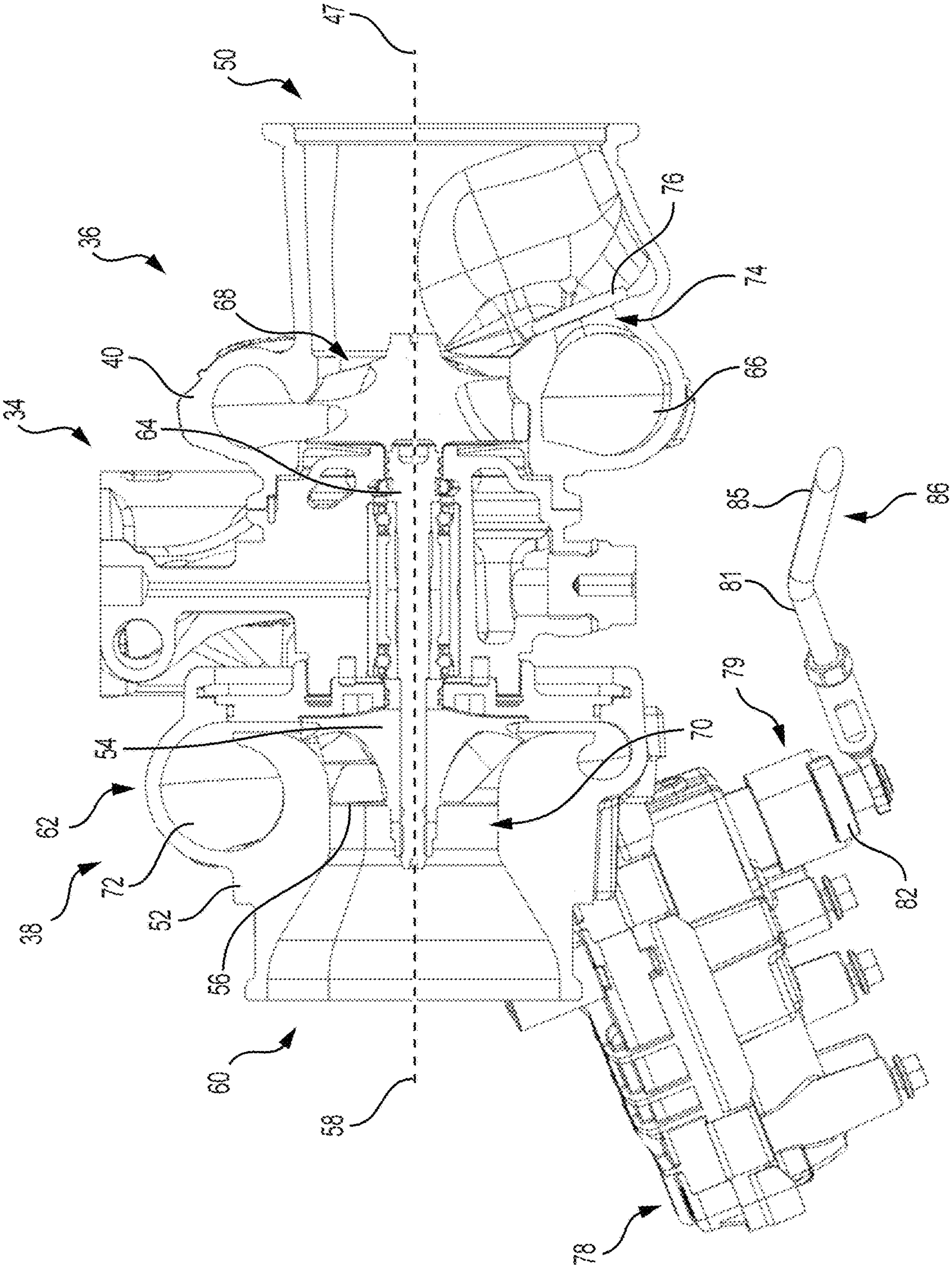
FIG. 4 is a cross-sectional view of the turbocharger of FIG. 3 taken along line 4-4, with a wastegate valve of the turbocharger in a closed position.

With reference to FIGS. 3 to 5, the linkage assembly 80 includes two connecting members 82, 84 and a linkage rod 86 connected therebetween. The first connecting member 82 is operatively connected to the output shaft 79 of the wastegate actuator 78 and is rotatable thereby. The second connecting member 84 is operatively connected to the wastegate valve 76. The linkage rod 86 is positioned in between and connects to the connecting members 82, 84. The linkage rod 86 has three portions 81, 83, 85 which form a generally bent configuration. As seen in FIGS. 4 and 5, portion 81 of the linkage rod 86 is connected to connecting member 82 and portion 83 of the linkage rod 86 is connected to connecting member 84, with portion 85 extending therebetween. Portion 81 and portion 83 of the linkage rod 86 extend substantially parallel to one another, while portion 85 extends therebetween forming an angle between the two portions 81, 83. The bent configuration of the linkage rod 86 enables the linkage rod 86 to navigate around the turbocharger 34 geometry and provides flexibility and dampening to accommodate for movements between the wastegate actuator 78 and the wastegate valve 76. It is contemplated that the linkage assembly 80 may be configured differently in different embodiments.

A wastegate controller 100 is communicatively coupled to the wastegate actuator 78 (schematically represented in FIG. 7) for controlling operation of the wastegate actuator 78. The wastegate actuator 78, in turn, controls operation of the wastegate valve 76. In this embodiment, a position of the wastegate valve 76 is not directly known. Instead, the wastegate controller 100 determines a position of the wastegate valve 76 based on a position of the wastegate actuator 78. The wastegate actuator 78 includes an output shaft position sensor 102, in communication with the wastegate controller 100, for detecting the position of the wastegate actuator 78. When the closed position of the wastegate valve 76 is desired, the wastegate actuator 78 is moved to a closed position. Likewise, when the opened position of the wastegate valve 76 is desired, the wastegate actuator 78 is moved to an opened position.

Figure 7:
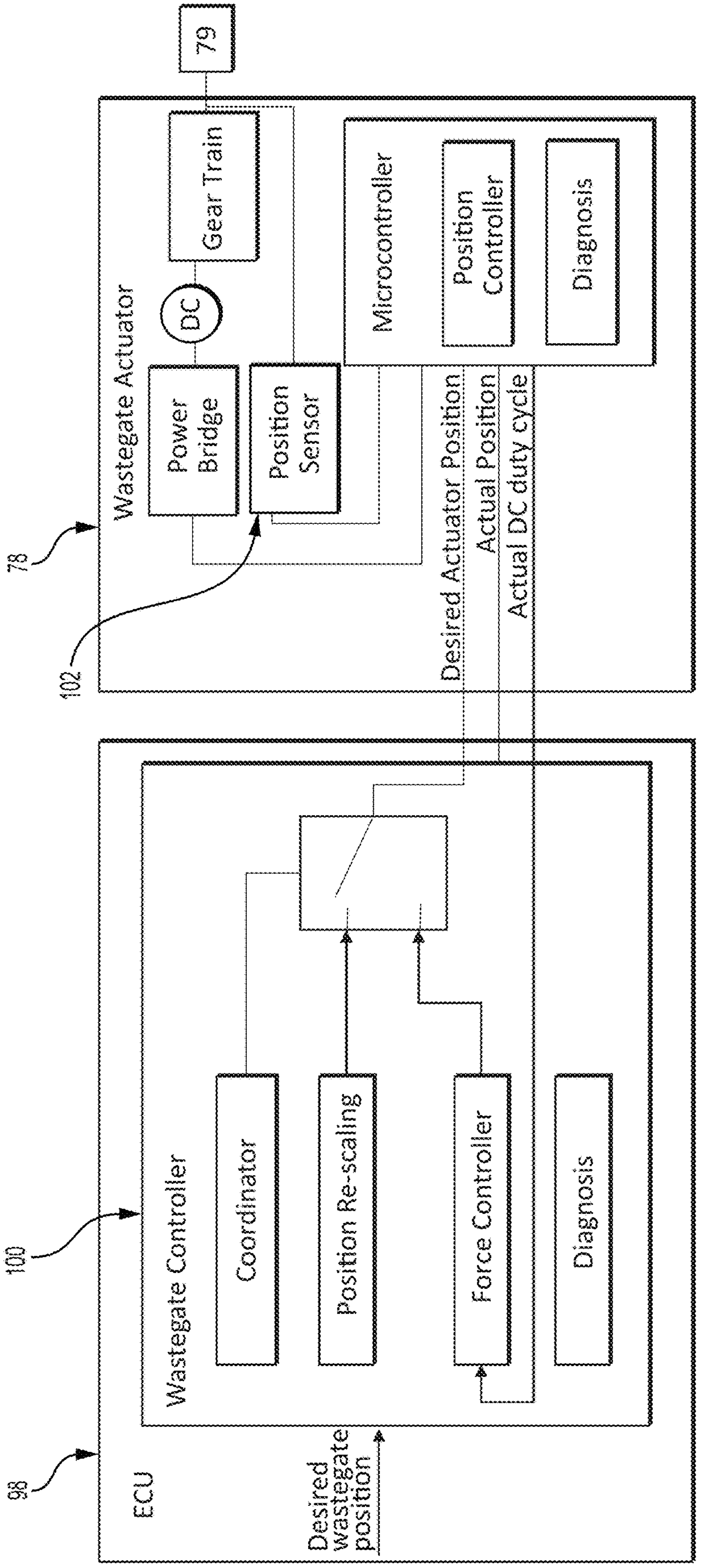
FIG. 7 is a schematic of controllers of the vehicle for controlling the wastegate valve of the turbocharger of FIG. 3.

The wastegate controller 100 is communicatively coupled to an engine control unit (ECU) 98 of the vehicle 10 (schematically represented in FIG. 7). The ECU 98 is operatively connected to the engine 30 and monitors various engine parameters. The ECU 98 determines the desired boost pressure based on engine parameters and desired performance input by the driver, such as a position of a gas pedal (not shown). If the desired boost pressure is different than the current boost pressure, the ECU 98 sends a desired position request to the wastegate controller 100 to move the wastegate actuator 78 to a desired position, thereby adjusting the position of the wastegate valve 76.

If a maximum boost pressure is desired, the ECU 98 sends a closed position request to the wastegate controller 100. In turn, the wastegate actuator 78 moves to the closed position, closing the wastegate valve 76 and the bypass conduit 74, thereby directing exhaust gases towards the turbine wheel 42. However, in some instances, the turbine housing 40, wastegate valve 76, and linkage assembly 80 may be subject to dimensional tolerances and wear, and will, during operation, undergo thermal expansion due to the extreme heat generated by exhaust gases. These effects may lead to improper closure of the wastegate valve 76. To accommodate for dimensional variations and thermal effects on the turbine housing 40, the wastegate controller 100 is configured to perform a method 200 of controlling the wastegate valve 76 to compensate for said dimensional variations and thermal effects.

Figure 8:
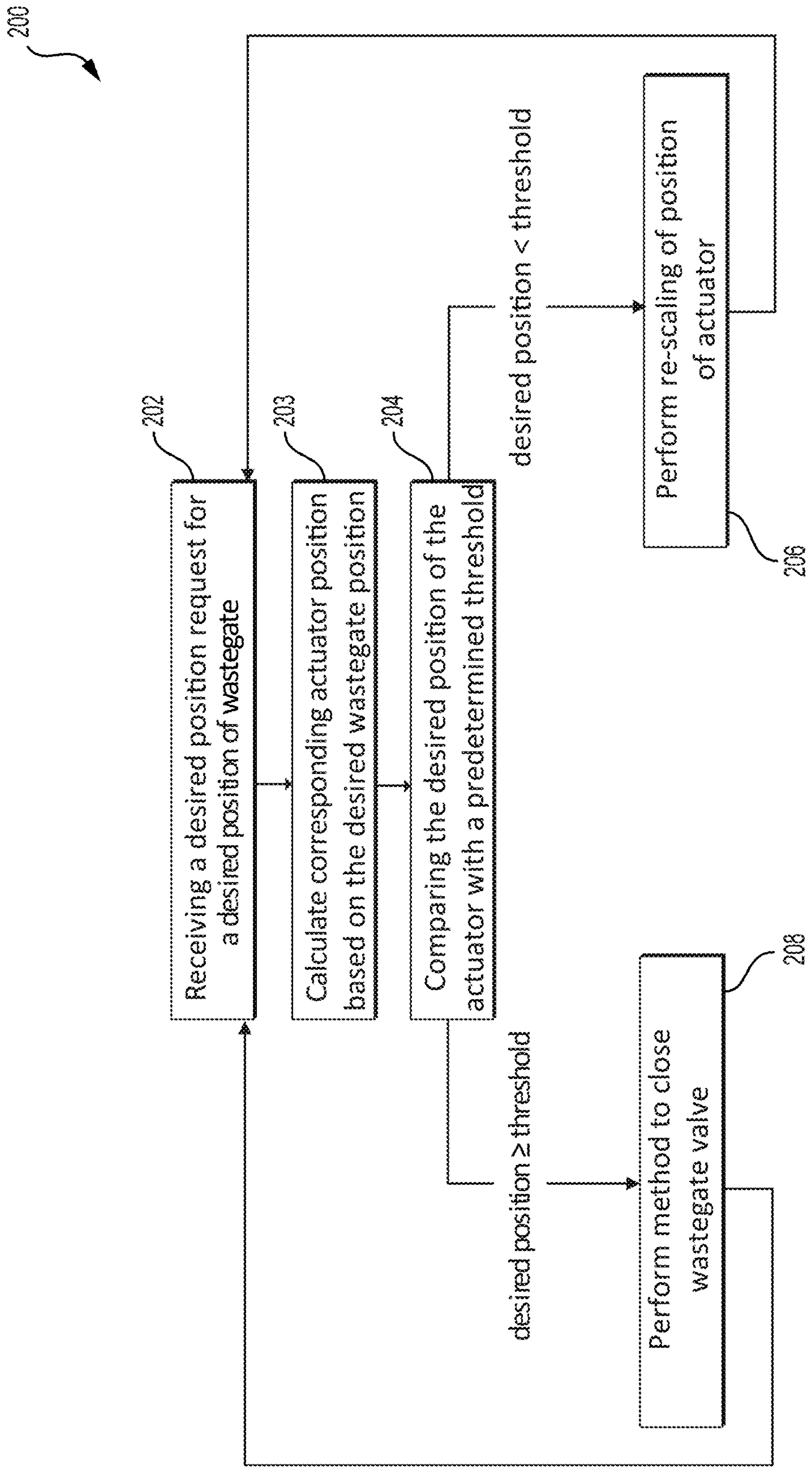
FIG. 8 is a flow diagram depicting a method for controlling the wastegate valve of the turbocharger of FIG. 3.
Figure 9:
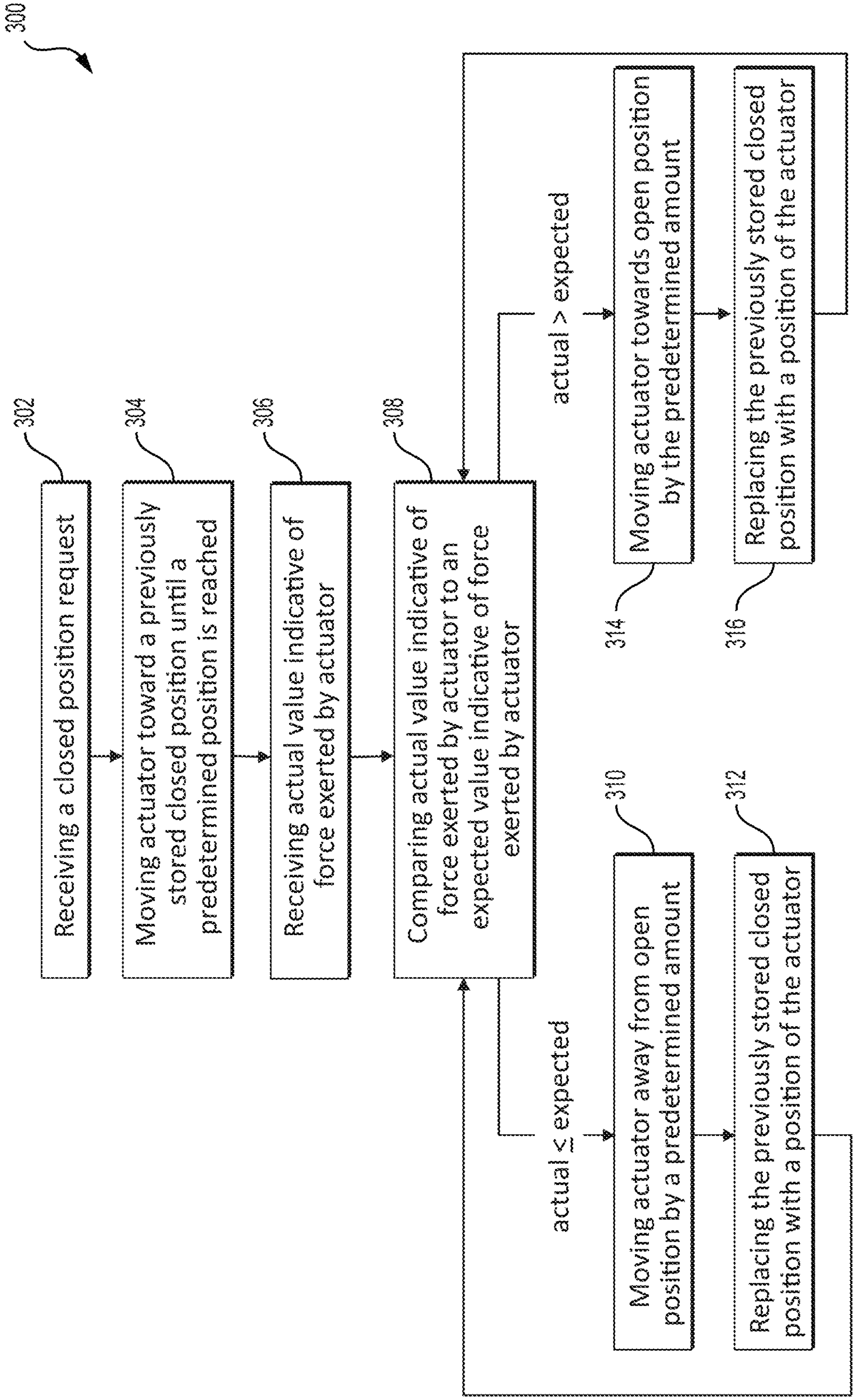
FIG. 9 is a flow diagram depicting a method for controlling the wastegate valve of the turbocharger of FIG. 3.
Figure 10:
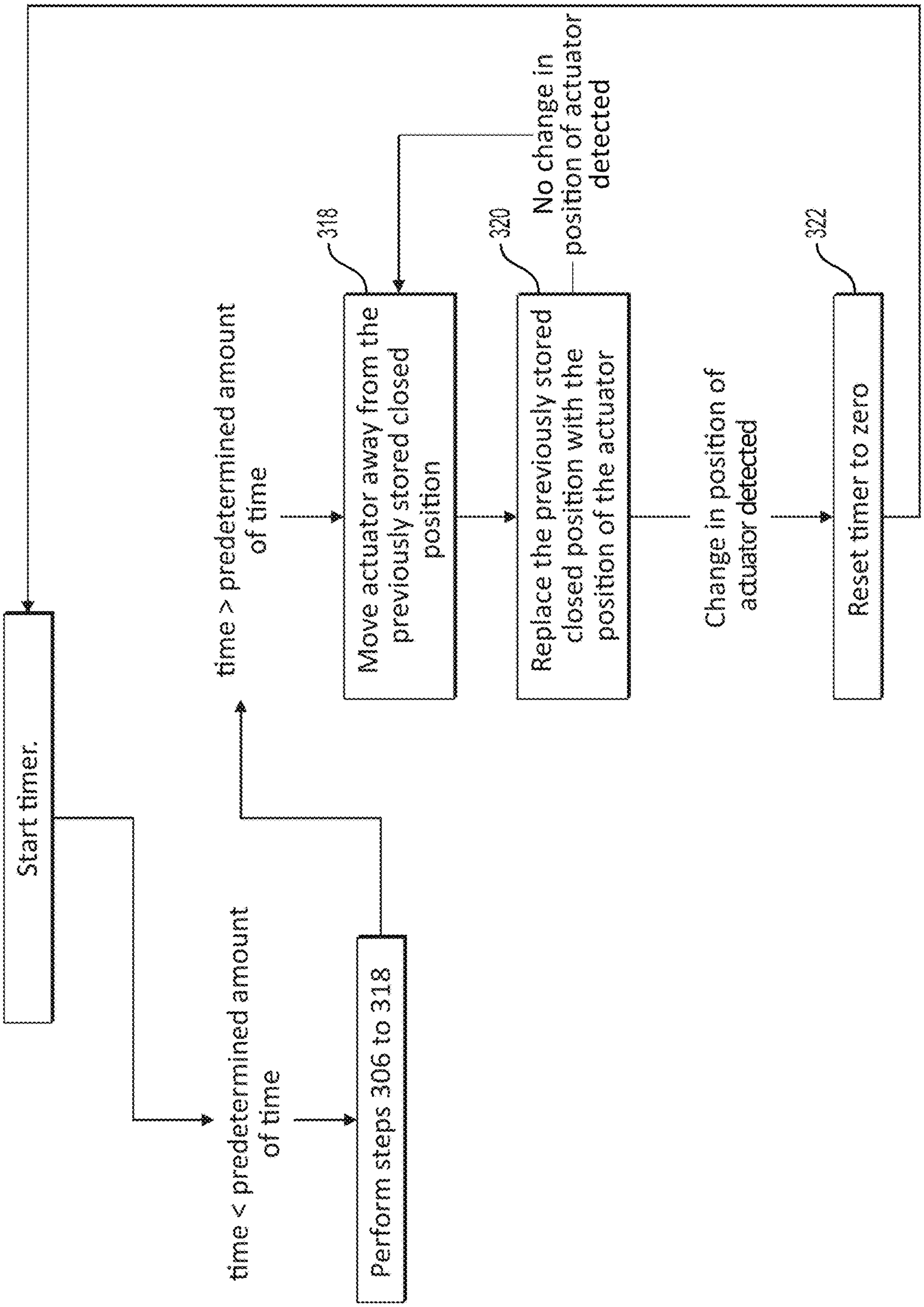
FIG. 10 is a flow diagram depicted a method for controlling the wastegate valve of the turbocharger of FIG. 3.

With reference to FIGS. 8 to 10, the method 200 for controlling the wastegate valve 76 will be described. Broadly, the method 200 is a feedback loop which continually adjusts the closed position of the wastegate actuator 78 to compensate for thermal effects on the turbine housing 40. In this embodiment, the closed position of the wastegate actuator 78 is stored on a memory storage of the ECU 98, for example on an EEPROM. In other words, the closed position of the wastegate actuator 78 is stored and this stored closed position will be referred to hereinafter as a previously closed position.

In response to powering on the engine 30, the previously stored closed position of the wastegate actuator 78 is retrieved from the memory storage of the ECU 98 and sent to the wastegate controller 100. Additionally, in response to powering on the engine 30, the open position of the wastegate actuator 78 is retrieved from the memory storage of the ECU 98 and sent to the wastegate controller 100. It is noted that, in response to powering off the engine 30, the wastegate actuator 78 is moved to the open position and thus, will always start from the open position.

As depicted in FIG. 8, the method 200 begins, at step 202, with the wastegate controller 100 receiving the desired position request from the ECU 98 for the desired position of the wastegate valve 76. At step 203, the wastegate controller calculates a desired position of the wastegate actuator 78 corresponding to the desired position of the wastegate valve 76.

In this embodiment, the desired position of the wastegate actuator 78 is compared against an allowable range. If the desired position of the wastegate actuator 78 falls outside an allowable range, an error indication will be sent to the operator of the vehicle 10, such as an error message on the display 29 of the vehicle 10. However, in alternative embodiments, this may be omitted.

At step 204, the desired position of the wastegate actuator 78 is compared with a predetermined threshold. In this embodiment, the predetermined threshold is 99.5% of the previously stored closed position, where the fully opened position is 0% and the previously stored closed position is 100%. However, it is contemplated that the predetermined threshold may vary in other embodiments.

If the desired position of the wastegate actuator 78 is less than the predetermined threshold, the method 200 will continue, at step 206, to re-scale the position of the wastegate actuator 78 based on the previously stored closed position. That is, if the ECU 98 requests an intermediate position for the wastegate actuator 78, between the opened position and the previously stored closed position, this intermediate position is re-scaled based on the previously stored closed position. For example, if the intermediate position requested is a middle position (50%) of the wastegate actuator 78, the intermediate position would be re-scaled as 50% of the previously closed position, where 0% is the fully opened position and 100% is the previously stored closed position. In this embodiment, the open position remains fixed and not adjusted based on the previously stored closed position. As such, if the ECU 98 requests an open position for the wastegate actuator 78, no re-scaling is needed. However, it is contemplated that, in alternative embodiments, the open position may be adjusted based on the previously stored closed position such that a total working range of the wastegate actuator 78 is maintained. In some instances, the adjusted open position may be stored on a memory storage of the ECU 98.

Alternatively, if the desired position of the wastegate actuator 78 is equal to or greater than the predetermined threshold, this is considered a closed position request and the method 200 will continue, at step 208, to perform a method 300 for closing of the wastegate actuator 78 thereby closing the wastegate valve 76, described in further detail below. It is contemplated that, in alternative embodiments, if the desired position of the wastegate actuator 78 is equal to the predetermined threshold, the method would continue with re-scaling, at step 206.

With reference to FIG. 9, the method 300 for closing the wastegate actuator 78 will now be described. The method 300 begins, at step 302, with receiving the closed position request from the ECU 98 (determined at step 204 of the method 200).

At step 304, the wastegate controller 100 moves the wastegate actuator 78 towards the previously stored closed position until reaching a predetermined actuator position. In this embodiment, the predetermined actuator position is 95% of the previously stored closed position. However, the predetermined actuator position may differ in different embodiments. For example, in other embodiments, the predetermined actuator position may be the previously stored closed position.

Once the wastegate actuator 78 reaches the predetermined actuator position, the method 300 continues, at step 306, with receiving an actual value indicative of force exerted by the wastegate actuator 78. At step 308, the actual value indicative of force exerted by the wastegate actuator 78 is compared with an expected value indicative of force exerted by the wastegate actuator 78. In this embodiment, the force exerted by the wastegate actuator 78 is based on a duty cycle (DC) of the wastegate actuator 78. That is, force exerted by the wastegate actuator 78 to actuate the wastegate valve 76 is proportional to the DC of the wastegate actuator 78. The actual value indicative of force exerted by the wastegate actuator 78 is based on an actual DC of the wastegate actuator 78. The expected value indicative of force exerted by the wastegate actuator 78 is based on an expected DC of the wastegate actuator 78. In this embodiment, the expected DC is predetermined during manufacturing of the vehicle 10 and is a constant value corresponding to the DC when the wastegate valve 76 is in a closed position. It is contemplated that the expected DC may be different in different embodiments, for example the expected DC may be a range of values. It is further contemplated that other parameters may be used instead of the actual and expected DC as an indication of actual and expected force exerted by the wastegate actuator 78.

In some cases, the engine 30 may be shut down while hot. In this instance, the previously stored closed position was saved during thermal expansion of the turbine housing 40. When the engine 30 is powered on, the turbine housing 40 would have cooled. To mitigate risk of the wastegate valve 76 contacting the turbine housing 40 too quickly, and potentially damaging the wastegate valve 76 and/or the turbine housing 40, the speed of the wastegate actuator 78 is reduced as it approaches the previously stored closed position. Specifically, the wastegate actuator 78 moves at a first speed until it reaches the predetermined distance from the previously stored closed position at step 306. The speed of the wastegate actuator 78 is reduced such that, subsequent steps of the method 300 are performed at a second, slower speed. It is contemplated that, in other embodiments, the wastegate actuator 78 may move at a single, fixed speed.

In response to the actual DC of the wastegate actuator 78 being less than or equal to the expected DC of the wastegate actuator 78, which is indicative of the wastegate valve 76 not being actually closed yet, the method 300 continues, at step 310, with moving the wastegate actuator 78 away from the open position by a predetermined amount. In this embodiment, the predetermined amount is 0.01% of a total working range of the wastegate actuator 78. The predetermined amount may vary in other embodiments. At step 312, the position of the wastegate actuator 78, after being moved by the predetermined amount, is stored and replaces the previously stored closed position. Steps 308 to 312 are repeated until the actual DC is greater than the expected DC.

During operation, as the wastegate actuator 78 moves incrementally away from the open position, at some point the actual DC of the wastegate actuator 78 increases. This increase occurs because the wastegate valve 76, moved by the output shaft 79 which is actuated by the wastegate actuator 78, contacts portions of the turbine housing 40 which define the bypass conduit 74, sealing the bypass conduit 74. Therefore, more force, and consequently more DC, is required by the wastegate actuator 78 to move the output shaft 79 as there is now resistance provided by the turbine housing 40. As the wastegate actuator 78 continues to incrementally move the output shaft 79, the force applied to the linkage assembly 80 increases, reducing any play in the connecting elements, while the actual DC of the wastegate actuator 78 continues to increase and approaches the expected DC. It should be understood that, prior to the actual DC approaching close to the expected DC, the output shaft 79 moves and therefore, the position sensed by the output shaft position sensor 102 changes. When the actual DC approaches close to the expected DC, the wastegate valve 76 is determined to be tightly sealing the bypass 74. Therefore, when the position of the wastegate actuator 78 further increases, the output shaft 79 does not move, and the position sensed by the output shaft position sensor 102 does not change. In other words, the wastegate actuator 78, specifically the worm-drive, moves which increases stress in the linkage assembly 80, the wastegate actuator 78, and the wastegate valve 76 without moving the position of the output shaft 79 (and consequently the wastegate valve 76).

In response to the actual DC of the wastegate actuator 78 being greater than the expected DC of the wastegate actuator 78, the method 300 continues, at step 314, with moving the wastegate actuator 78 toward the open position by the predetermined amount. In alternative embodiments, if the actual DC of the wastegate actuator 78 is equal to or greater than the expected DC of the wastegate actuator 78, the method 300 will continue with moving the wastegate actuator 78 toward the open position by the predetermined amount (step 314). At step 316, the position of the wastegate actuator 78 after being moved by the predetermined amount, is stored and replaces the previously stored closed position. Steps 308, 314 and 316 are repeated until the actual DC is less than or equal to the expected DC.

During operation, as the wastegate actuator 78 moves incrementally towards the open position, the actual DC of the wastegate actuator 78 decreases. This decrease occurs because the force applied to the output shaft 79, the linkage assembly 80 and the wastegate valve 76 decreases and the amount of force (and thereby, the DC) required by the wastegate actuator 78 is reduced. As the wastegate actuator 78 continues to incrementally move towards the open position, the actual DC of the wastegate actuator 78 continues to decrease until it is less than the expected DC. It should be understood that, at this point, the wastegate valve 76 is still tightly sealing the bypass 74, and the position of the output shaft 79 sensed by the output shaft position sensor 102 has not changed. In other words, the incremental movement of the wastegate actuator 78 towards the open position reduces stress in the linkage assembly 80, the wastegate actuator 78, and the wastegate valve 76, without moving the position of the output shaft 79 (and consequently the wastegate valve 76).

While the method 300 is performed, the thermal expansion of the turbine housing 40 may change, causing the actual closed position of the wastegate valve 76 to change toward the open position. In this case, the stress in the wastegate actuator 78, linkage assembly 80, wastegate valve 76 and turbine housing 40 would increase, but the actual DC would not increase significantly, because the worm-drive included in the wastegate actuator 78 generally limits its sensitivity to external forces. To alleviate the build-up of stress between the wastegate actuator 78 and the turbine housing 40 during the method 300, steps 306 to 316 are performed for a predetermined time interval. This mitigates risk of potential damage to the wastegate valve 76, the linkage assembly 80, the wastegate actuator 78, and/or the turbine housing 40. Upon reaching the predetermined actuator position, a timer starts. In this embodiment, the predetermined time interval is five seconds. It is contemplated that the predetermined time interval may be different in other embodiments.

With reference to FIG. 10, if the time is less five seconds, steps 306 to 316 are performed accordingly as described above.

After performing steps 306 to 316 for five seconds, the method 300 continues, at step 318, with moving the wastegate actuator 78 towards the open position by the predetermined amount. The method 300 continues with step 320, of replacing the previously stored closed position with the position of the wastegate actuator 78 after step 318. If a position of the output shaft 79 changes, detected by the output shaft position sensor 102, the method 300 continues, at step 322, with resetting the timer back to zero and beginning at step 306 again. If the position of the output shaft 79 does not change (that is, no change is the position of the output shaft 79 is detected by the output shaft position sensor 102), the method 300 performs step 318 again. This continues until the wastegate controller 100 receives a desired position request from the ECU 98 which is an open or intermediate position request.

During the execution of the method 300, if the position of the wastegate actuator 78 which replaces the previously stored closed position (i.e., at steps 312, 316, and 320) falls outside of the allowable range, an error indication will be sent to the operator of the vehicle 10, such as an error message on the display 29 of the vehicle 10. However, in alternative embodiments, this may be omitted.

Modifications and improvements to the above-described embodiments of the present technology may become apparent to those skilled in the art. The foregoing description is intended to be exemplary rather than limiting.

What is claimed is:

1. A method for controlling a wastegate valve of a turbocharger fluidly connected to an internal combustion engine of a vehicle, the method being executed by a controller of the vehicle, the method including:

(a) receiving a closed position request from an engine control unit;

(b) moving an actuator toward a previously stored closed position until a predetermined actuator position is reached, the actuator being operatively connected to the wastegate valve for actuating the wastegate valve;

(c) once the predetermined actuator position is reached, receiving an actual value indicative of force exerted by the actuator; and (d) comparing the actual value indicative of force exerted by the actuator to an expected value indicative of force exerted by the actuator;

in response to the actual value indicative of force being less than the expected value indicative of force, (e) moving the actuator away from an open position by a predetermined amount;

(f) replacing the previously stored closed position with a position of the actuator following step (e); and (g) repeating steps (d) to (f) until the actual value indicative of force exerted by the actuator is greater than the expected value indicative of force exerted by the actuator.

2. The method of claim 1, wherein:

in response to the actual value indicative of force exerted by the actuator being greater than the expected value indicative of force exerted by the actuator, the method further includes:

(h) moving the actuator toward the open position by the predetermined amount; and (i) replacing the previously stored closed position with a position of the actuator following step (h); and (j) repeating step (d) following step (i).

3. The method of claim 2, wherein steps (c) to (j) are performed for a predetermined time.

4. The method of claim 3, wherein the predetermined time is five seconds.

5. The method of claim 3, wherein:

after the predetermined time, the method further includes:

(k) moving the actuator away from the previously stored closed position until a position of an output member of the actuator changes;

(l) replacing the previously stored closed position with the position of the actuator following step (k);

(m) setting a timer for timing the predetermined time interval to zero seconds, and (n) continuing the method at step (c).

6. The method of claim 5, wherein the position of the output member of the actuator is determined by an output member position sensor.

7. The method of claim 1, further including:

prior to step (a), receiving a desired position request for a desired position of the actuator;

comparing the desired position of the actuator with a predetermined threshold; and in response to the desired position of the actuator exceeding the predetermined threshold, continuing onto step (a), wherein the closed position request at step (a) is the desired position request.

8. The method of claim 7, further including indicating an error if the desired position of the actuator is outside an allowable range.

9. The method of claim 1, wherein:

at step (b), the actuator moves the wastegate valve at a first speed; and at step (e), the actuator moves the wastegate valve at a second speed, the second speed being less than the first speed.

10. The method of claim 1, further including indicating an error if the position of the actuator at step (f) is outside an allowable range.

11. The method of claim 1, wherein in response to the internal combustion engine powering off, the method further includes moving the actuator to the open position.

12. The method of claim 1, wherein:

in response to the internal combustion engine powering on, the method further includes:

receiving the previously stored closed position of the actuator from a memory storage of the engine control unit; and receiving the open position of the actuator from the memory storage of the engine control unit.

13. The method of claim 1, wherein the expected value indicative of force exerted by the actuator is a predetermined value indicative of force.

14. The method of claim 1, wherein the actual value indicative of force exerted by the actuator is based on an actual duty cycle of the actuator, and the expected value indicative of force exerted by the actuator is based on an expected duty cycle of the actuator.

15. The method of claim 1, wherein the predetermined amount is 0.01% of a total actuator working range.

16. The method of claim 1, wherein the open position of the actuator is fixed.

17. The method of claim 1, wherein:

in response to receiving an intermediate position request from the engine control unit for an intermediate position of the actuator, the intermediate position of the actuator being between the open position and the previously stored closed position, the method further includes:

re-scaling the intermediate position of the actuator based on the previously stored closed position.

18. A turbocharger system for an internal combustion engine of a vehicle, the turbocharger system including:

a turbocharger having:

a turbine housing; and a turbine disposed in the turbine housing;

a bypass conduit defined by the turbine housing for selectively diverting exhaust gases away from the turbine;

a wastegate valve disposed in the bypass conduit for controlling flow of the exhaust gases through the bypass conduit;

an actuator having an output member operatively connected to the wastegate valve, the actuator movable between an open position and a previously stored closed position; and a wastegate controller communicatively coupled to the actuator for controlling operation of the actuator for controlling the wastegate valve, the wastegate controller being configured to:

(a) receive a closed position request from an engine control unit of the vehicle;

(b) move the actuator toward the previously stored closed position until a predetermined actuator position is reached;

(c) once the predetermined actuator position is reached, receive an actual value indicative of force exerted by the actuator; and (d) comparing the actual value indicative of force exerted by the actuator to an expected value indicative of force exerted by the actuator;

in response to the actual value indicative of force being less than the expected value indicative of force, (e) move the actuator away from the open position by a predetermined amount;

(f) replace the previously stored closed position with a position of the actuator following step (e); and (g) repeat steps (d) to (f) until the actual value indicative of force exerted by the actuator is greater than the expected value indicative of force exerted by the actuator.

19. The turbocharger system of claim 18, wherein the actuator is an electronic actuator.

20. The turbocharger system of claim 18, wherein the actuator includes an output member position sensor configured to detect a position of the output member of the actuator.

* * * * *